United States Patent [19]
Woo et al.

[11] Patent Number: 6,023,368
[45] Date of Patent: Feb. 8, 2000

[54] ILLUMINATION SYSTEM FOR USE WITH AN OPTICAL INSTRUMENT HAVING AN AUXILIARY MAGNIFYING LENS

[75] Inventors: Chang-woo Woo; Hee-duk Kim, both of Suwon; Kyue-sang Choi, Seoul, all of Rep. of Korea

[73] Assignee: Samsung Electronics Co., Ltd., Suwon, Rep. of Korea

[21] Appl. No.: 09/135,651

[22] Filed: Aug. 18, 1998

[30] Foreign Application Priority Data

Oct. 24, 1997 [KR] Rep. of Korea ............... 97-54900

[51] Int. Cl.[7] ........................................... G02B 21/06
[52] U.S. Cl. ............................ 359/387; 359/385; 359/390
[58] Field of Search ............................ 359/363, 368, 359/385–390

[56] References Cited

U.S. PATENT DOCUMENTS

| 1,444,400 | 2/1923 | Silverman | 359/387 |
| 1,873,149 | 8/1932 | Perez | 359/385 |
| 5,198,927 | 3/1993 | Rathbone et al. | 359/390 |
| 5,820,250 | 10/1998 | Betts et al. | 359/387 |

FOREIGN PATENT DOCUMENTS

| 2110981 | 10/1971 | Germany | 359/387 |
| 2348567 | 4/1975 | Germany | 359/387 |
| 63-100415 | 5/1988 | Japan | 359/387 |

*Primary Examiner*—Thong Nguyen
*Attorney, Agent, or Firm*—Jones Volentine, L.L.P.

[57] ABSTRACT

An optical microscope has an illuminator from which light emanates to illuminate an object under examination, and an auxiliary magnifying lens unit which magnifies an image of the object formed by the light reflecting from the object. A reflective cover is connected to the bottom of the ocular lens unit of the microscope. An auxiliary magnifying unit, made up of the auxiliary magnifying lens mounted in a casing, is disposed within the reflective cover adjacent the bottom of the ocular lens unit. The illuminator is located between the reflective cover and the casing of the auxiliary magnifying unit. The auxiliary magnifying lens is thus shielded from the illuminator. The light emitted from the illuminator is prevented from propagating directly to the auxiliary magnifying lens (along any straight line from the illuminator) or indirectly to the auxiliary magnifying lens via reflection from the inner wall of the reflective cover. Accordingly, a clear image of the object is produced. Furthermore, the reflective cover screws the auxiliary magnifying unit onto the bottom of the ocular lens unit. These components can be easily and quickly assembled and disassembled as the need arises.

5 Claims, 6 Drawing Sheets

ILLUMINATION SYSTEM FOR USE WITH AN OPTICAL INSTRUMENT HAVING AN AUXILIARY MAGNIFYING LENS

BACKGROUND OF THE INVENTION

1. Field of the Invention

The present invention relates to an optical microscope. More particularly, the present invention relates to the illuminator and magnifying unit of an optical microscope which illuminate the object being viewed under the microscope, and enlarge an image of the object, respectively.

2. Description of the Related Art

An optical microscope is used in general to enlarge the image of a specific portion of an object, which portion can not be seen with the naked eye.

First, the object is placed under an objective lens. Then a specific portion of the object is irradiated with light from an illuminator of the optical microscope. The light reflects from the object to an ocular lens through the objective lens and an auxiliary magnifying unit. Accordingly, an enlarged image of the specific portion of the object is produced. This enlarged image, of course, allows the user to make out the details of the specific portion of the object.

The conventional optical microscope will be described in more detail referring to FIGS. 1 to 5.

First, as shown in FIG. 1 and 2, the conventional optical microscope 10 includes an ocular unit 12, an illuminator 22, an auxiliary magnifying unit 16 comprising a casing and an auxiliary magnifying lens 14, an adapter 18, and a reflective cover 20.

The auxiliary magnifying unit 16 is mounted to the bottom of the ocular unit 12 by the reflective cover 20 via the adaptor 18. In addition, the illuminator 22 is fixed beneath the auxiliary magnifying unit 16 within the reflective cover 20. A case (not shown for simplicity) is provided beneath the illuminator 22, in order to provide a path for light induced through the objective lens.

Meanwhile, as shown in FIGS. 3 to 5, the illuminator 22 is tubular, and has two connected semi-annular portions disposed coaxially one above the other. The upper semi-annular portion has first ends connected to the lower semi-annular portion, and second ends comprising contacts 26, respectively, connected to a power line 24.

The contacts 26 are each arcuate and do not touch each other. The power line 24 is led away from the contacts 26 in such a direction that it will not interfere with the light led through the objective lens unit and into the auxiliary magnifying lens 14. The reflective cover 20 is sized to both accommodate the illuminator 22 and the power line 24 extending from the top of the illuminator 22 through the bottom of the cover 20.

Because the illuminator 22 is disposed below the auxiliary magnifying unit 16 within the reflective cover 20, the auxiliary magnifying lens 14 of the auxiliary magnifying unit 16 is directly exposed to the light emanating from the illuminator 22. Such light is led directly to the ocular lens unit 12 through the auxiliary magnifying lens 14.

Therefore, both the light reflected from the object and the light from the portion of the illuminator 22 to which the auxiliary magnifying lens 14 is exposed are mixed. This results in an unclear image of the object.

In addition, the optical path between the ocular lens unit 12 and the objective lens is rather long due to the structure of the illuminator 22, and the serial disposition of the illuminator 22 and the auxiliary magnifying unit 16. This limits the working space available to the user.

Finally, assembling or disassembling the components of the microscope 10, including the auxiliary magnifying unit 16, the reflective cover 20 and the illuminator 22, is time-consuming.

SUMMARY OF THE INVENTION

Accordingly, an object of the present invention is to provide an optical microscope which substantially overcomes one or more of the problems, limitations and disadvantages of the related art.

More specifically, one object of the present invention is to provide an optical microscope in which the light from the illuminator does not adversely affect the production of the image by the auxiliary magnifying lens.

Another object of the present invention is to provide an optical microscope in which the distance between the ocular lens unit and the objective lens unit is relatively small, thereby providing a good deal of working space beneath the objective lens.

A still further object of the present invention is to provide an optical microscope having components at the end of the ocular lens unit which can be assembled and disassembled in a short period of time.

To achieve these objects, the optical microscope of the present invention comprises an ocular lens unit having a male end at its bottom and a tubular reflective cover having a female end at its top mated with the male end of the ocular lens unit. The diameter of the other (bottom) end of the reflective cover is larger than that of its top. An auxiliary magnifying unit comprising a casing having an auxiliary magnifying lens therein, is disposed inside the reflective cover adjacent the bottom of the ocular lens uni. An illuminator is located between an inner wall of the reflective cover and an outer wall of the casing of the auxiliary magnifying unit.

Accordingly, the casing of the auxiliary magnifying unit shields the auxiliary magnifying lens from the illuminator. This prevents light emanating from the illuminator from propagating through the auxiliary magnifying lens without having first been reflected from the object under examination.

The male end of the ocular lens unit is threaded as is the female end of the reflective cover. The casing of the auxiliary magnifying unit has threads on the outer wall thereof which mate with the threads of the female end of the reflective cover. In this way, the ocular lens unit, the reflective cover, and the auxiliary magnifying unit are screwed together. Accordingly, these components can be quickly and easily assembled to and disassembled from one another.

The reflective cover has a hole extending therethrough, and a power line passes through the hole and is connected within the reflect cover to the illuminator. The illuminator is preferably fixed by some appropriate means to the reflective cover or the casing of the auxiliary magnifying unit. In addition, the illuminator preferably has only a single semi-annular portion and does not protrude beyond the bottom of the auxiliary magnifying unit. Such a compact configuration contributes to minimizing the optical path of the microscope, thereby leaving more working space under the objective lens unit.

BRIEF DESCRIPTION OF THE DRAWINGS

These and other objects, features and advantages of the present invention will become more clearly understood from the following detailed description of a preferred embodiment thereof, made with reference to the accompany drawings, of which.

DETAILED DESCRIPTION OF THE PREFERRED EMBODIMENT

Reference will now be made in detail to the preferred embodiment of the present invention illustrated in the accompanying drawings.

Figure 1:
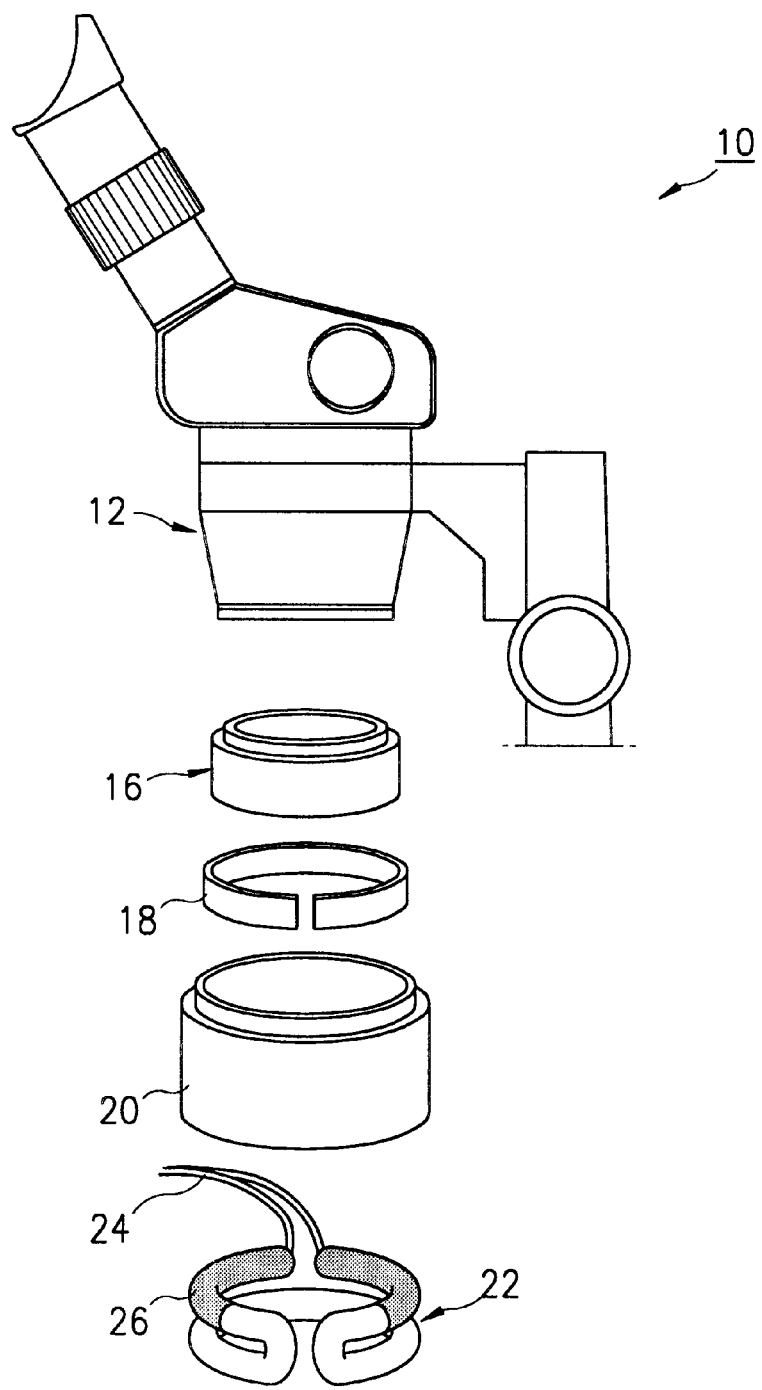
FIG. 1 is an exploded perspective view of a conventional optical microscope.
Figure 2:
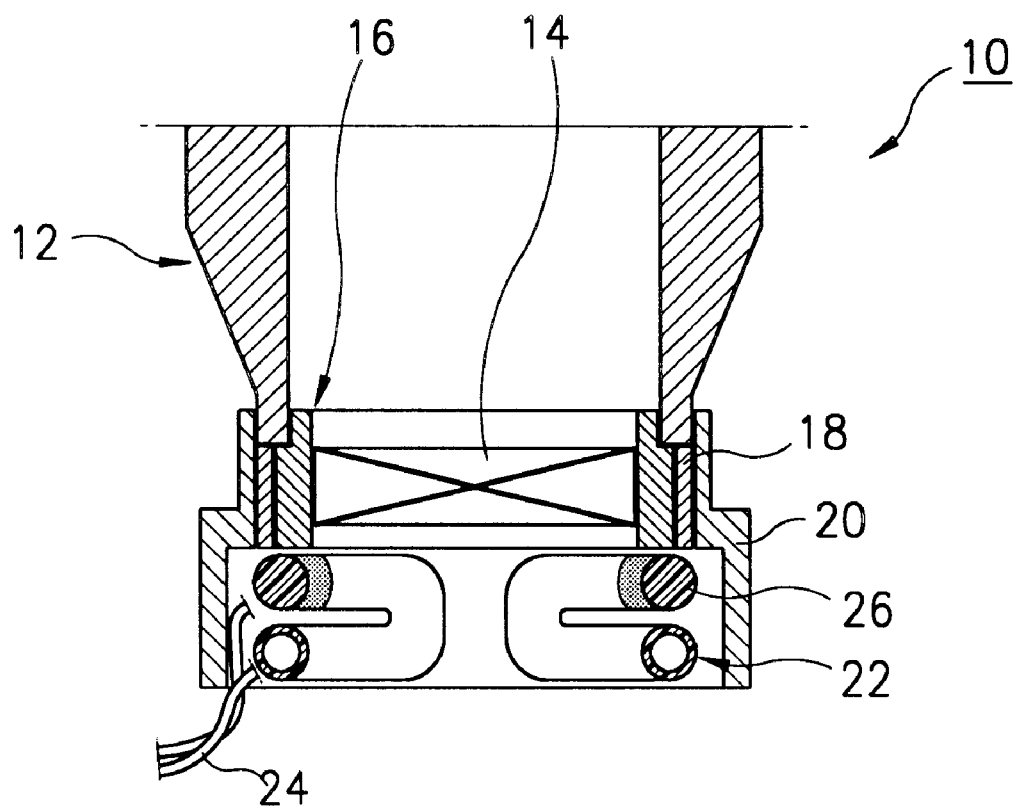
FIG. 2 is a cross-sectional view of an essential part of the conventional microscope of FIG. 1.
Figure 3:
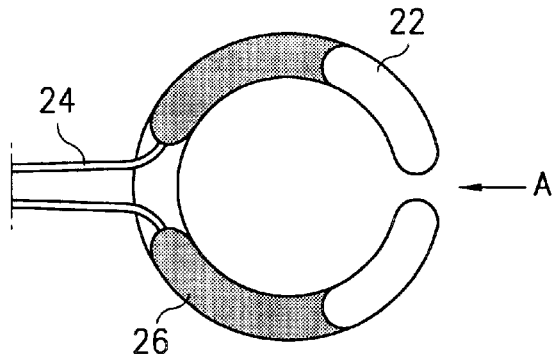
FIG. 3 is a top view of the illuminator thereof.
Figure 4:
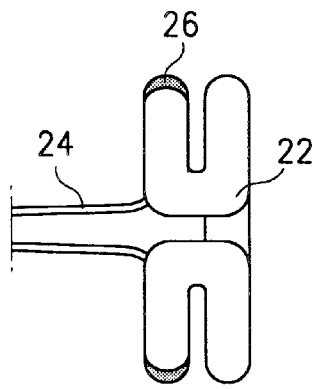
FIG. 4 is a side view of the illuminator taken in the direction indicated by arrow A in FIG. 3.
Figure 5:
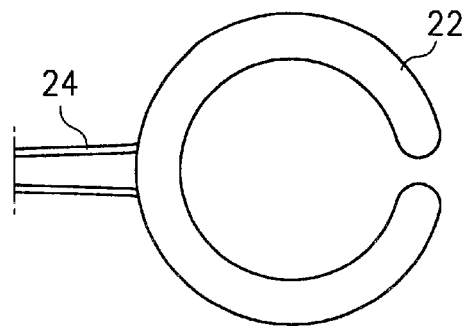
FIG. 5 is a view of the illuminator.
Figure 6:
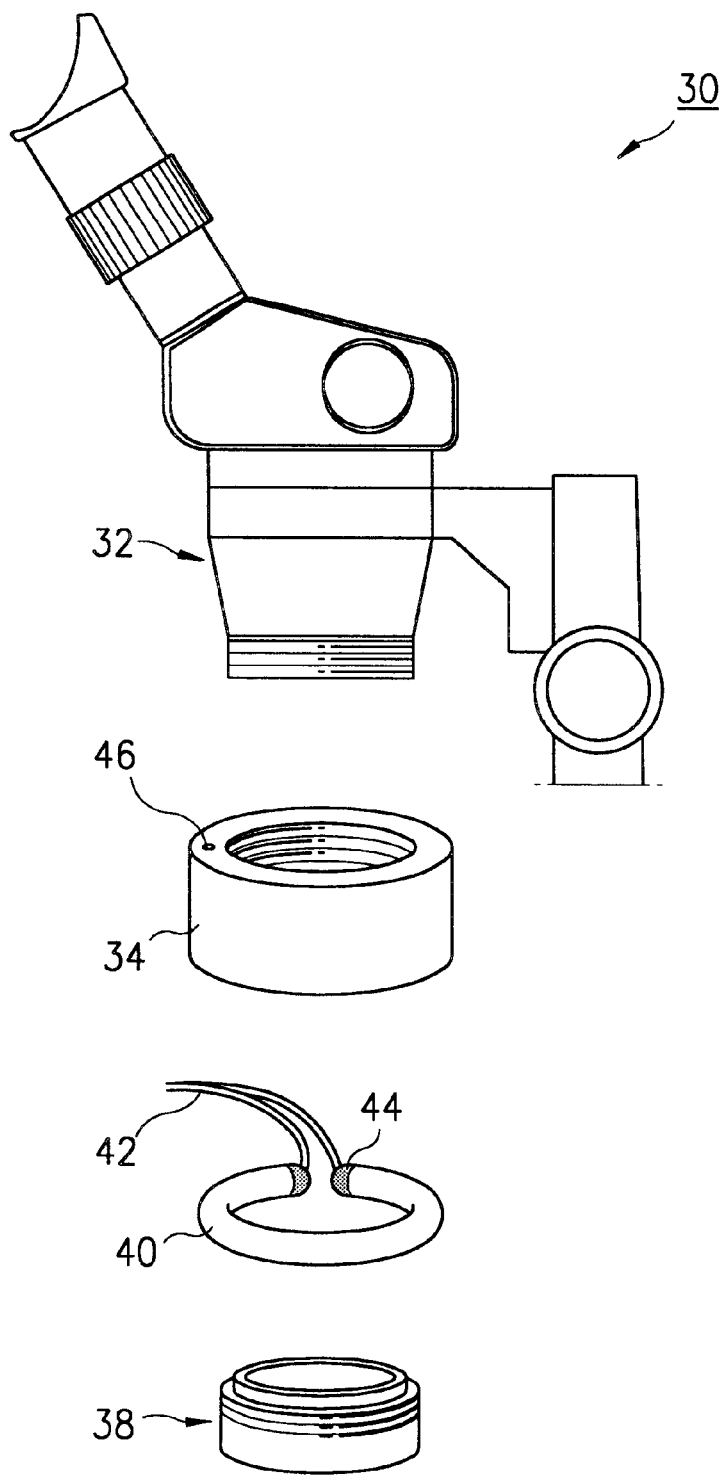
FIG. 6 is a exploded perspective view of the optical microscope according to the present invention.
Figure 7:
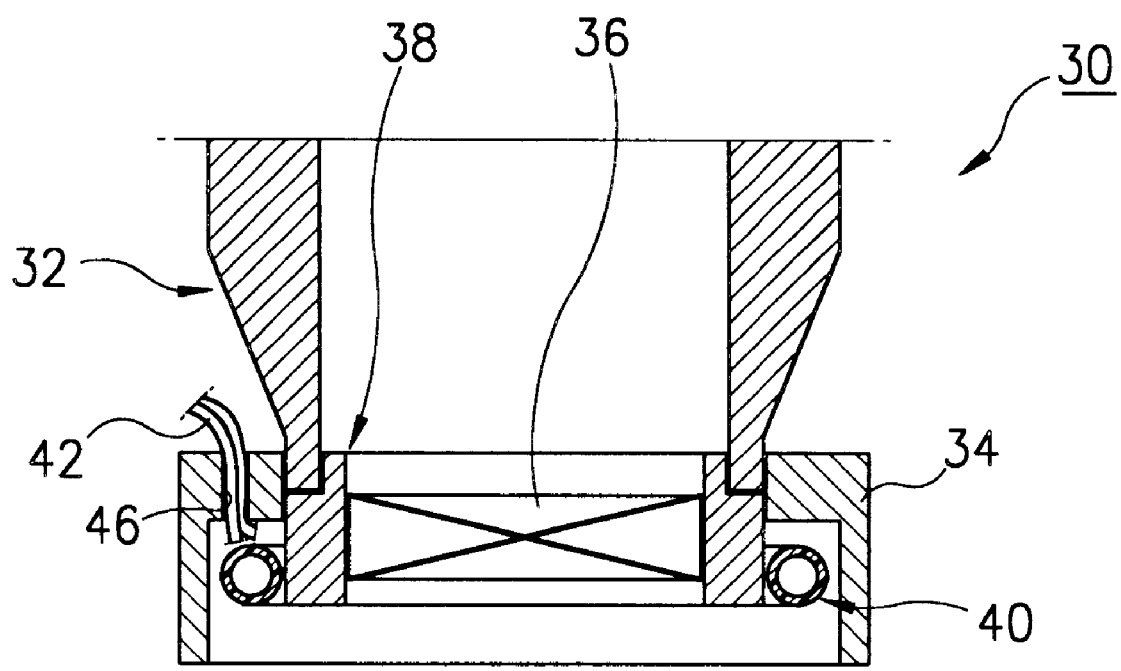
FIG. 7 is a cross-sectional view of an essential part of the optical microscope according to the present invention.

The optical microscope 30 of the present invention, as shown in FIG. 6 and FIG. 7, comprises an ocular lens unit 32, a reflective cover 34 mounted to the bottom of the ocular lens unit 32, an auxiliary magnifying unit 38 disposed inside the reflective cover 34, and a semi-annular illuminator 40 interposed between the reflective cover 34 and the auxiliary magnifying unit 38.

The bottom of the ocular lens unit 32 comprises a male screw portion, i.e., has threads at the outside thereof. The reflective cover 34 is tubular, and short, meaning that its length is at most equal to the outer diameter thereof. In addition, the reflective cover 34 has a female screw portion complementary to the male screw portion of the ocular lens unit 32, i.e., has threads at the inside thereof which can be mated with the threads at the bottom of the ocular lens unit 32. The diameter of the bottom end of the tubular reflective cover 34 is larger than that of its upper end.

The auxiliary magnifying unit 38 comprises a casing, and an auxiliary magnifying lens 36 mounted inside the casing. The casing of the auxiliary magnifying unit 38 has a male screw portion corresponding to that of the ocular lens unit 32. The threads of the male screw portion of the casing of the auxiliary magnifying unit 38 can thus also mate with threads of the female screw portion of the reflective cover 34.

As shown best in FIG. 7, the top of the auxiliary magnifying unit 38 is configured to extend from the bottom of the ocular lens unit 32 within the reflective cover 34 so that the reflective cover 34 couples the auxiliary magnifying unit 38 to the ocular lens unit 32. As can be seen in FIG. 7, the reflective cover 34 is tubular with an upper end of the reflective cover 34 mating with the ocular lens unit 32 having a smaller inner diameter than that of a lower end of the reflective cover 34 housing the illuminator 40. In a preferred embodiment, the illuminator 40 is mounted in a space between an outer wall of the auxiliary magnifying unit 38 and an adjacent inner wall of the reflective cover 34 radially separated from the outer wall of the auxiliary magnifying unit such that the illuminator 40 does not protrude below the bottom of the auxiliary magnifying unit 38.

Figure 8:
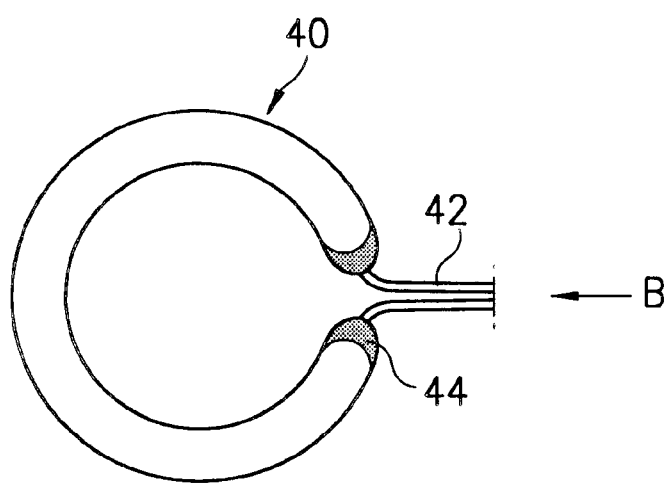
FIG. 8 is top view of the illuminator thereof.
Figure 9:
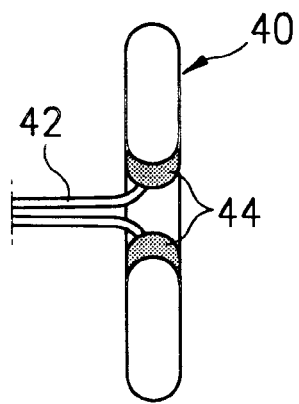
FIG. 9 is side view of the illuminator taken in the direction indicated by arrow B in FIG. 8.

Turning to FIG. 8 and FIG. 9, the illuminator 40 is fixed in place between the inner wall of the reflective cover 34 and the outer wall of the auxiliary magnifying unit 38 by means not shown. That is, the illuminator is disposed between the reflective cover 34 and the casing of the auxiliary magnifying unit 38 as viewed in the radial direction of the casing or in a direction perpendicular to the optical path of the microscope 10.

Moreover, the illuminator 40 has the shape of a single semi-annular close-ended tube. Each of the closed ends of the semi-annular illuminator 40 comprises a respective contact 44 connected to a power line 42. The two contacts 42 are located very closely to each other but do not touch.

Returning to FIG. 6 and FIG. 7, a penetrating hole 46 extends through the reflective cover 34. The power line 42 is led into the reflective cover 34 through the penetrating hole 46 where it is connected to each end of the illuminator.

In the optical microscope 30 of the present invention as described above, the casing (outer wall) of the auxiliary magnifying unit 38 shields the auxiliary magnifying lens 36 from the illuminator 40 so that the light emitted from the illuminator 40 is prevented from propagating directly to the auxiliary magnifying lens 36 (along any straight line from the illuminator) or indirectly to the auxiliary magnifying lens 36 via reflection from the reflective inner wall of the cover 34. Accordingly, a clear image is produced.

In addition, the illuminator 40 has only a single semi-annular portion, and is interposed between the reflective cover 34 and the auxiliary magnifying unit 38. Accordingly, the distance between the ocular lens unit 32 and the objective lens unit (not shown) is relatively short, allowing for a good deal of space to be left below the objective lens unit.

In addition, the simple structure of the microscope (components) allows it to be assembled and/or disassembled quickly and easily.

Although the present invention has been described in detail, it should be understood that various changes, substitutions and alterations can be made thereto without departing from the spirit and scope of the invention as defined by the appended claims.

What is claimed is:

1. An illumination system for use with an optical instrument comprising:

an ocular lens unit, a bottom of said ocular lens unit has threads on an outside thereof;

a tubular reflective cover having an upper end and a lower end, the upper end of said reflective cover having threads on an inside thereof mating with the threads at the bottom of said ocular lens unit, mounting the reflective cover to said ocular lens unit;

an auxiliary magnifying unit including a casing, and an auxiliary magnifying lens disposed in and fixed to said casing, said auxiliary magnifying unit being disposed inside of said reflective cover adjacent a bottom of said ocular lens unit, a space being formed between an outer wall of the casing of said auxiliary magnifying unit and an inner wall of said reflective cover radially spaced from the outer wall of the casing, said casing of the auxiliary magnifying unit having, at the outer wall thereof, threads which mate with the threads of said reflective cover, said reflective cover coupling said auxiliary magnifying unit to said ocular lens unit; and an illuminator mounted in the space.

2. The illumination system of claim 1, wherein said reflective cover has a penetrating hole extending therethrough, and further comprising a power line passing through said penetrating hole and connected to said illuminator.

3. The illumination system of claim 1, wherein said illuminator has a shape consisting of that of a single semi-annular close-ended tube.

4. The illumination system of claim 1, wherein said reflective cover has an axial length equal to at most an outer diameter thereof.

5. The illumination system of claim 1, wherein said lower end of said reflective cover has an inner diameter which is larger than that of said upper end.

* * * * *